Patented June 11, 1929.

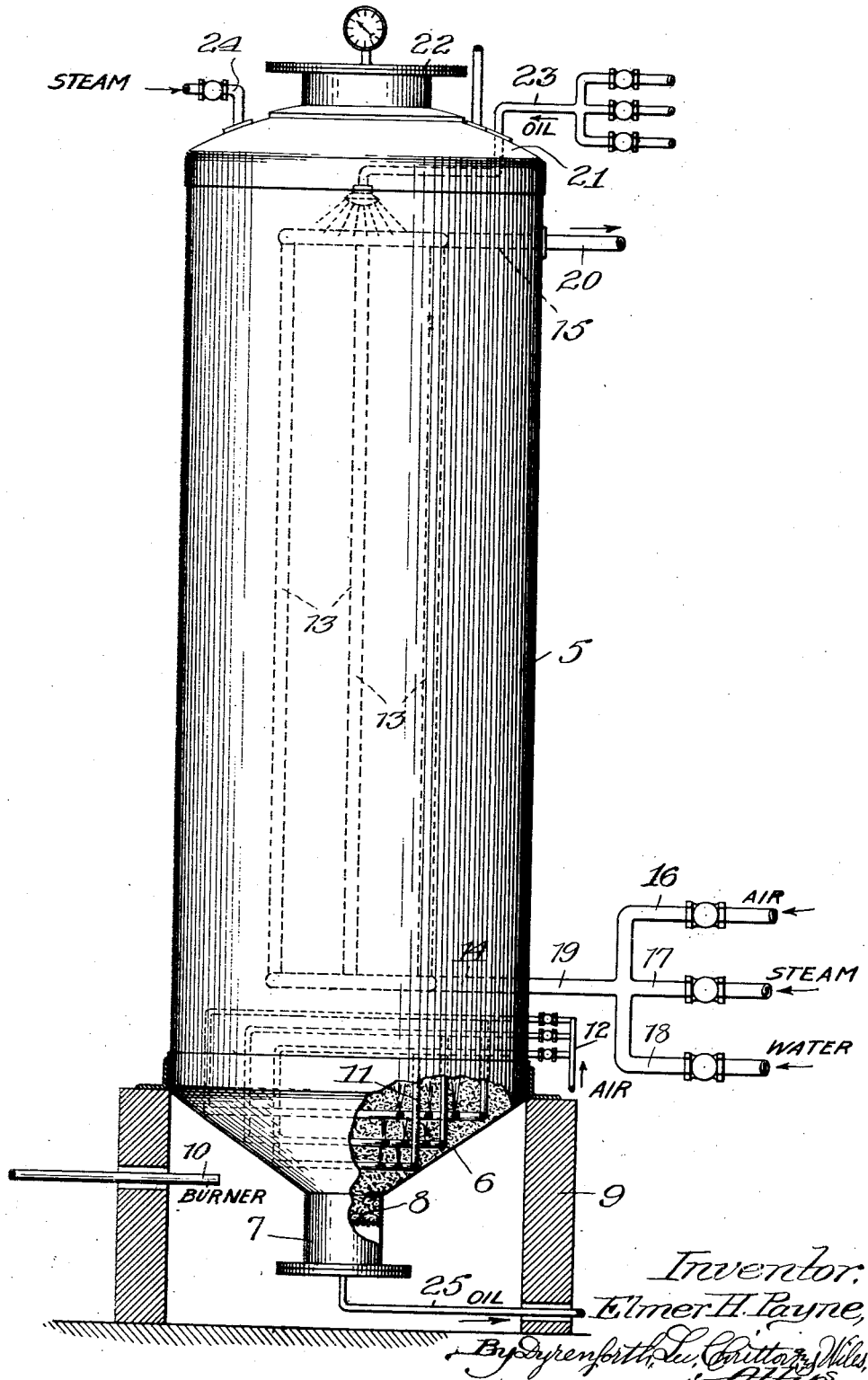

1,716,974

UNITED STATES PATENT OFFICE.

ELMER H. PAYNE, OF WOOD RIVER, ILLINOIS, ASSIGNOR TO STANDARD OIL COMPANY, OF WHITING, INDIANA, A CORPORATION OF INDIANA.

ART OF REFINING HYDROCARBON OIL.

Application filed June 17, 1925. Serial No. 37,823.

The present invention relates to improvements in the art of refining hydrocarbon oils, and will be fully understood from the following description, illustrated by the accompanying drawings, in which apparatus for carrying out the invention is shown in side elevation.

In the drawing, the numeral 5 indicates a container or filter, suitably of cylindrical form, the lower portion thereof being preferably of inverted conical form as at 6 and terminating in a smaller cylindrical chamber 7 in which is provided a screen 8 which serves as a support for an inorganic filtering material, preferably fuller's earth, in the filter 5. The filter is suitably mounted on a setting 9 in which is provided a gas or oil burner 10 or other suitable device, playing on the lower portion of the filter, only slightly above the screen 8.

In the lower portion of the filter 5, and preferably within the inverted conical portion 6, there are provided a plurality of perforated coils 11, connecting exteriorly of the filter with a manifold or line 12 by which, as hereinafter pointed out, air or other suitable oxidizing gas may be supplied within the filter. A plurality of closed tubes 13 are provided extending through the main body of the filter 5 and normally completely surrounded by the fuller's earth or other filtering material contained therein. These coils terminate at the bottom in an inlet header 14 and at the top in an outlet header 15. A plurality of conduits 16, 17 and 18 are connected with the inlet liine 19 leading to the inlet conduit 14. The outlet conduit 15 is provided with an outlet line 20 extending exteriorly of the filter.

The top of the filter is closed by a suitable cover 21, preferably riveted or welded in place, and this cover is provided with a suitable manhead 22. An oil line 23 is provided for supplying oil in the upper portion of the filter. A line 24 is also provided, for supplying steam into the body of the filter as hereinafter pointed out.

In operation, the filter is filled with fuller's earth or other suitable filtering material to a level preferably slightly above the outlet manifold 15. The filtering material is prepared so as to be immediately available for filtering purposes, and the oil to be refined is forced into the filter through the oil line 23. It percolates through the body of filtering material, making its exit through the run-down line 25 at the base of the filter. The flow of oil through the filter is continued until the the filtering material loses its efficiency, and the oil discharged no longer shows that the desired refining or decolorizing has been effected. The flow of oil is then stopped and a suitable washing liquid, such as naphtha, is forced into the filter and flows through the filtering material, removing a large part of the oil remaining therein. This naphtha, with dissolved oil, likewise flows out through the run-down line 25 and is separately disposed of, as is customary in refinery practice.

When the washing operation has been completed, the naphtha is removed from the fuller's earth by steaming, the steam being suitably supplied through the line 24. Preferably during this operation, steam is supplied from the steam line 17 through the inlet pipe 19 and inlet manifold 14 to the tubes 13 extending through the mass of filtering material. The steam thus supplied aids in heating up the mass of filtering material, facilitates the removal of the naphtha, and substantially reduces the proportions of water remaining in the filtering material after the steaming operation is completed.

After removal of the naptha, heat is applied to the bottom constricted portion of the filter by means of the burner 10 or other suitable device. Air is supplied in the lower portion of the filter, the air being forced through line 12 into the coils 11. A temperature is soon attained at a localized point in the bottom of the filter at which ignition of the organic material present in the filtering material takes places, this temperature being suitably about 580 to 650° F. The temperature gradually rises as combustion continues with the aid of the air supplied through the coils 11, and a temperature of 900 to 1200° F., and preferably 1000 to 1100° F. is attained. Combustion of the organic matter present in the filtering material in the zone to which heat is supplied causes the adjacent portions or zones of filtering material to be brought to ignition temperatures, and new zones of combustion are formed. The zone of combustion gradually travels upwardly through the filter, the temperature of the filtering material being controlled by the supply of air through the coils 11, and if desired, by causing cold air to flow through the tubes 13, thereby preventing excessive heating of the interior portions of the filtering material. As the combustion zone travels upwardly through the filter, the burned out portions of filtering material gradually cool. After the combustion zone has reached the mass of filtering material in the filter, and has ceased, the temperature of the entire body of filtering material may be reduced to any point desired, and preferably to below 180° F., by flowing water from the main 18 through the line 19, the inlet tube 14 and the tubes 13. When the mass of filtering material has been cooled sufficiently, the filtering operation may again begin.

Although the present invention has been described in connection with certain details of operation and construction, it is not intended that these details shall be regarded as limitations upon the scope of the invention, except in so far as included in the accompanying claims.

I claim:

1. In apparatus for the refining of hydrocarbon oils, a chamber, means for supporting within said chamber a body of filtering material, means for supplying oil to be refined to said filtering chamber and causing it to travel through said body of filtering material, means for withdrawing oil products from said filtering chamber, means for locally heating the filtering material in said chamber, means for supplying an oxygen-containing gas in proximity to the point of local heating thereof, the supply of such gas causing combustion of organic matter in the filtering material in a zone which travels through the body of filtering material, closed conduits embedded within the body of filtering material, and means for passing an attemperating fluid through said conduits.

2. In apparatus for refining oils, a vertical chamber having a constricted lower portion, a screen in the constricted lower portion for supporting a body of filtering material in said chamber, means for supplying oil in the upper portion of said chamber, means for withdrawing oil from below said screen, means for locally heating the filtering material in the constricted portion of said chamber, perforated coils in the lower portion of the chamber, means for supplying air thereto, the supplied air effecting combustion of the organic matter in the locally heated portion of the filtering material and causing said combustion to travel through the mass thereof, conduits extending through said chamber, and means for supplying an attemperating fluid to said conduits.

ELMER H. PAYNE.